Aug. 29, 1961   JEAN-PAUL BRUNOT   2,997,892
GEAR BOX CONTROL MECHANISM
Filed May 20, 1959   3 Sheets-Sheet 1
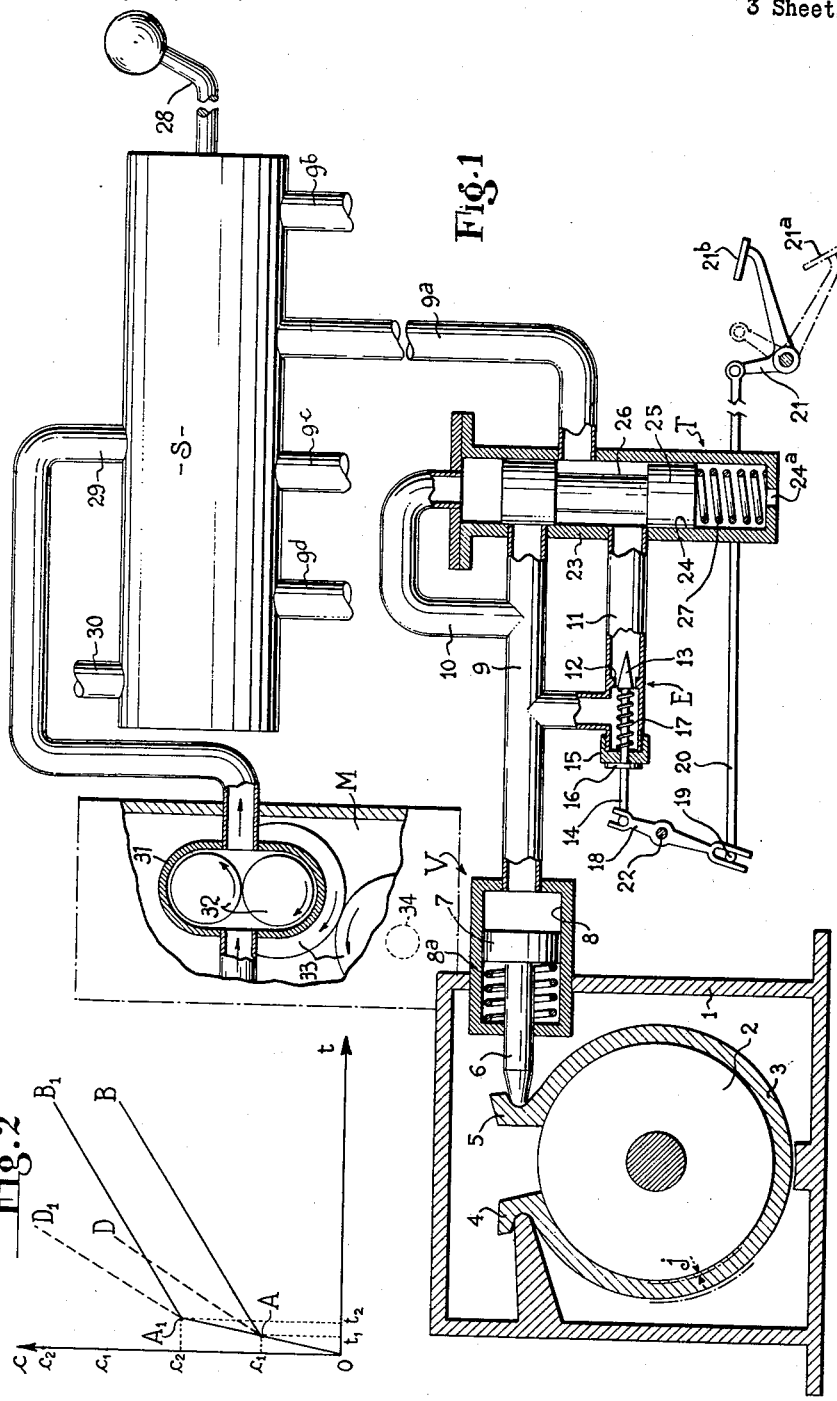
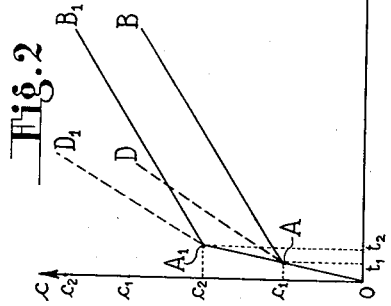
Inventor:
Jean-Paul BRUNOT
by J Delatter-Seguy
Attorney Aug. 29, 1961  JEAN-PAUL BRUNOT  2,997,892
GEAR BOX CONTROL MECHANISM
Filed May 20, 1959 3 Sheets-Sheet 2
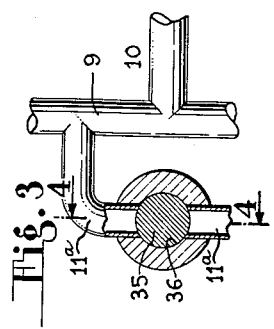
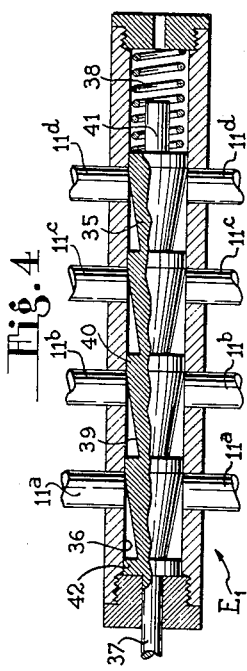
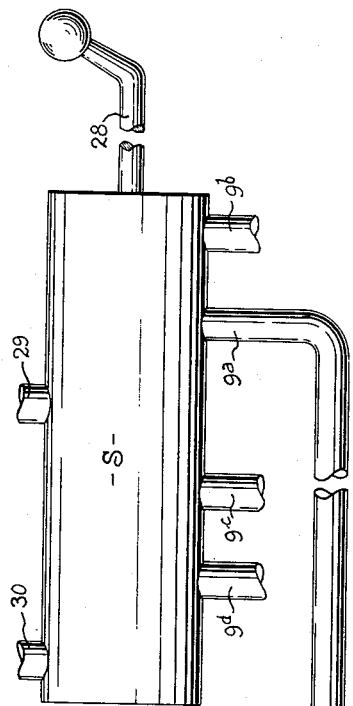
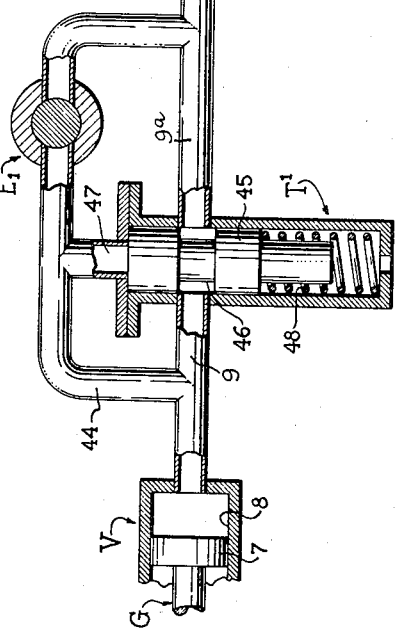
Inventor:
Jean-Paul BRUNOT
by: J. Delattre-Segny
Attorney Aug. 29, 1961 JEAN-PAUL BRUNOT 2,997,892
GEAR BOX CONTROL MECHANISM
Filed May 20, 1959 3 Sheets-Sheet 3

Inventor:
Jean-Paul Brunot
by J. Allatter Segny
Attorney

United States Patent Office 2,997,892
Patented Aug. 29, 1961

2,997,892
GEAR BOX CONTROL MECHANISM
Jean-Paul Brunot, Sens, France, assignor to Compagnie de Pont-A-Mousson, Nancy, France, a French body corporate
Filed May 20, 1959, Ser. No. 814,546
Claims priority, application France May 22, 1958
5 Claims. (Cl. 74—472)

The present invention relates to hydraulic control mechanisms for gear boxes which are used on vehicles and machines driven by a variable torque motor and which are of the type having gear elements which are always in mesh and in which each speed is engaged by the moving element of an immobilizing brake, braking at least one element of the gear box, and/or of coupling means coupling two elements of said box.

An object of the invention is to provide a simplified control mechnism for a gear box of this type.

In the mechanism of the invention, at least one of the moving elements engaging a speed is connected directly to the piston of a ram which is connected to a source of liquid under pressure by a main pipe and by a secondary branch pipe provided with a throttle device, at least said main pipe being controlled by an automatic distributor which is adapted to create a progressive closure of said main pipe as a function of the pressure increase in the ram.

As will be understood, the liquid supplied to the ram depends on the position of the distributor. When it is wide open, the throttling device has no or only slight effect on the liquid supply to the ram and consequently on its action, whereas the throttling device alone ensures the supply to the ram when the distributor is in its fully closed position.

Owing to the combination of this throttling device and this distributor, the liquid supply to the ram therefore decreases with increase in the pressure prevailing in the ram.

In one embodiment, the throttling device is adjustable by means of the movable accelerator means which controls the flow of carbureted fuel to the engine intake.

It is thus possible to modify the changing conditions, namely the speed at which the speeds of the gear box are changed, as a function of the driving torque which varies with said flow.

Further features and advantages of the invention will be apparent from the ensuing description with reference to the accompanying drawings to which the invention is in no way limited.

In the drawings:

FIG. 1 is a diagrammatic sectional view of a mechanism according to the invention;

FIG. 2 is a diagram showing variation in the travel of the ram piston with respect to time;

FIG. 3 is a cross-sectional view of a modification of the throttling device;

FIG. 4 is a longitudinal sectional view taken along line 4—4 of FIG. 3, and

FIG. 5 is a partial view, similar to FIG. 1, of a modification of the mechanism of the invention.

Figure 1A:
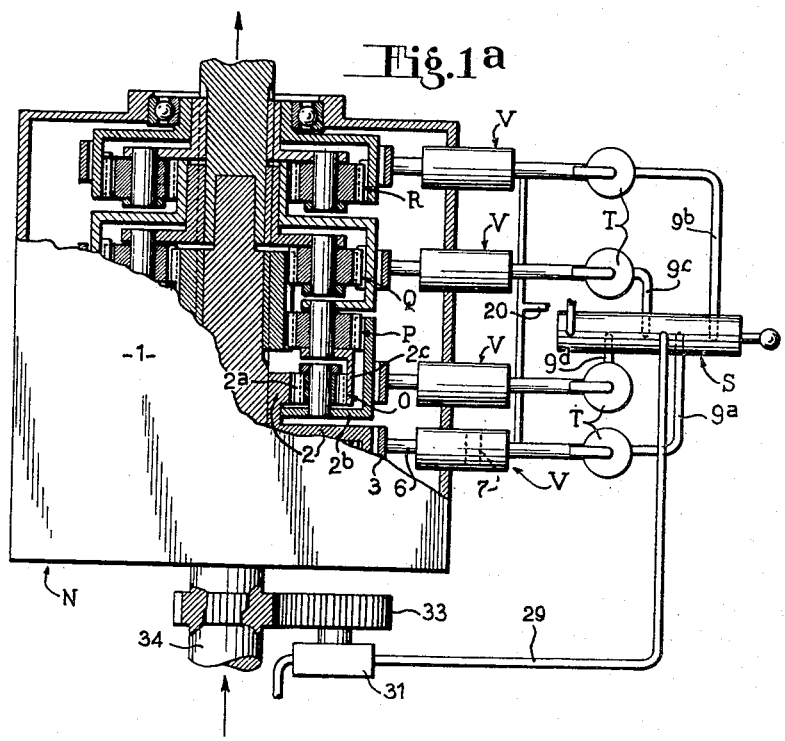
FIG. 1a is a diagrammatic plan view, with parts cut away, of a gear box provided with a mechanism according to the invention.

In the embodiment shown in FIGS. 1 and 1a, the invention is applied to a motor vehicle driven by an internal combustion engine M through the medium of a gear box N. This gear box N may be of the well known Wilson type; it comprises (FIG. 1a) epicyclic gear trains O, P, Q, R, disposed inside a housing 1. Each of these gear trains comprises a central planet or sun gear such as 2, satellites such as $2^a$ carried by a satellite-carrier such as $2^b$, and an outer planet gear $2^c$ having inner teeth; each satellite $2^a$ meshes permanently with the planet gears 2 and $2^c$ and a gear train is activated by the stoppage of one of its constituent elements, for instance the central gear 2 in the case of the gear train O. The gear trains are combined together because one of the elements of one gear train forms another element of another gear train. For instance, the satellite-carrier $2^b$ of gear train O forms the outer planet gear of gear train P.

Reference can now be had to FIG. 1 which shows the mechanism in its combination with element 2 of gear train O, in order to permit the activation of said gear train. On FIG. 1, the gear box N is shown only partially; the housing 1 and said element 2, which is kept stationary, are found in said FIG. 1.

In order to obtain a given drive ratio, the gear 2 is held stationary or immobilized by means of a flexible brake segment or element 3 in the form of an open collar which surrounds and is concentric with the gear 2. One of the ends of the segment 3 is hooked at 4 to the housing 1 whereas the other end is directly engaged by a hook 5 on the stem 6 of the piston 7 of an actuating ram V. The piston 7 is caused to slide in a cylinder 8 rigid with the housing 1 by the action of oil under pressure supplied by a portion 9 of a main pipe (9, $9^a$) in opposition to a spring $8^a$ which is compressed between the piston 7 and the end wall of the cylinder 8.

Connected to the portion 9 of the main pipe (9, $9^a$) are two other pipes 10 and 11. The pipe 11 is provided with an adjustable throttling device consisting of a ring 12 through which extends a conical needle valve 13 the base of which has a diameter less than that of the aperture of the ring. This needle valve is fixed to the end of a rod 14 which slides in a plug 15 screw-threadedly engaged on the pipe 11, a flange 16 provided on the rod constituting an outer abutment adapted to abut against the plug 15. The needle valve 13 is subjected to the opposing actions of, on the one hand, a spring 17 compressed between the base of the needle valve and the plug 15 within the pipe 11, and, on the other hand, a double shifting fork 18 which is pivotably mounted on a fixed spindle 22 and is engaged with one end of the rod 14 and with a bar 19 rigid with one of the ends of a rod 20. The latter is pivoted at its other end to a pedal 21 which also actuates the fuel butterfly valve or other accelerating means of the engine M, that is, the means governing the driving torque. The needle valve 13 is movable between two extreme positions in one of which its point is at the entrance of the aperture of the ring 12 (the pedal being depressed to the maximum extent to the position $21^a$ shown in dot-dash line). In the other position of the needle valve, its base is at the entrance of the ring 12 (the pedal 21 is slightly depressed as shown at $21^b$ in full line).

The pipes 9, 10 and 11 are connected to a slide valve type distributor T. The latter comprises a body 23 in which is formed a cylindrical chamber 24 communicating with the pipes 9 and 10. The pipe 10 communicates with one end of this chamber, the other end of the latter communicating with the exterior by way of an aperture $24^a$.

A slide valve 25 comprising two flanges separated by a median recess 26 slides in the chamber 24.

A spring 27 is compressed between the slide 25 and the wall of the chamber 24 having the aperture $24^a$. Also communicating with the chamber 24 between the pipes 9 and 11 is the second portion $9^a$ or upstream portion (relative to the direction of flow of the liquid) of the main pipe (9, $9^a$). This portion $9^a$ is connected to a selector S of known type having a moving slide valve. The selector S, operated by a lever 28, is adapted to distribute oil under pressure, supplied by a supply pipe 29, to one of four pipes 9a, 9b, 9c, 9d, which supply liquid respectively to one of the four rams V (FIG. 1a), which permit engaging one of the gear trains O, P, Q, or R, or alternatively to connect one of these pipes to a discharge aperture 30. The pipe 29 is supplied with oil for example by a pump 31. The latter could, for example, be of the type having gears 32 driven by a transmission 33 from the shaft 34 of the engine M.

Each of the portions 9b, 9c, 9d of the main pipes is connected by a distributor, identical to the illustrated distributor T (FIGS. 1 and 1a), to a first portion of the main pipe, identical to the portion 9. Thus there are as many distributors T as there are hydraulic circuits, such as 9, 10 and 11, throttling devices E and shifting forks 18, and rams V as are speed ratios that the gear box is able to provide, but there is only a single rod 20 and a single bar 19 acting on all the forks 18 simultaneously.

The apparatus operates in the following manner:

It will be assumed that the engine of the vehicle is running and that a speed change has just been effected. In the interests of clarity it will also be first assumed that the needle valve 13 is stationary. As the ram V has just been selected by means of the selector S, its cylinder 8 does not yet contain oil under pressure. Consequently, the pressure prevailing in the pipes 9 and 10 is substantially zero and the slide valve 25 of the distributor is biased by the spring 27 against the end of the body 23 provided with the pipe 10. The recess 26 of this slide thus provides a passage between the portions 9a and 9 of the main supply pipe which directly supplies the ram V with liquid.

The cylinder 8 is thus supplied with oil under pressure by way of the elements 9a, T and 9 at full flow rate and the piston 7 is moved in opposition to the action of the spring 8a. In so moving, it moves the end 5 of the brake segment 3 toward the end 4 and the brake thus rapidly closes round the gear 2 until it comes into contact with the outer face of the latter. At this instant, friction and a certain resistance to tightening occurs. This resistance is transmitted to the piston 7 by the stem 6 and is manifested by an increase in the oil pressure in the pipes 9 and 10 and the cylinder 8. As soon as a certain pressure is reached, this pressure is sufficient to rapidly urge the slide 25 to the position shown in FIG. 1 in opposition to the action of the spring 27. The pipe portion 9 is then closed, whereas the pipe 11 provided with the throttling device is put in communication by way of the recess 26 with the upstream portion 9a of the main pipe. The supply of liquid to the ram V then proceeds at a pressure which increases with the tightening of the segment 3 on the gear 2 but at a flow rate which is much lower than the preceding flow rate owing to the throttling of the pipe 11 by the ring 12 and the needle valve 13.

Thus the piston 7 is displaced slowly and the tightening of the brake segment 3 is terminated progressively. When the segment 3 is fully tightened and the gear 2 immobilized thereby, the new speed ratio is fully engaged. The hydraulic circuit shown in FIG. 1 remains filled with liquid under maximum pressure corresponding to immobilization of the gear 2.

The tightening of the segment 3 against the gear 2 proceeds therefore in two stages; a rapid approach stage until there is contact between the segment 3 and the gear 2, followed by a slow and progressive final tightening.

The diagram shown in FIG. 2, in which the time $t$ is plotted as abscissae and the travel $c$ of the piston 7 of the ram V as ordinates, illustrates the operation as described herein-before. The rapid approach stage is represented by the straight line OA and the slow tightening stage by the straight line AB.

In the event of great wear of the brake segment 3, the travel of the piston 7 corresponds to the line $OA^1B^1$. There is therefore an additional approach travel $c^1c^2$, corresponding to the line $AA^1$, and an additional approach time $t^1t^2$ which is very small and hardly noticed.

Thus it is clear that, owing to the invention, that is, the direct connection between the ram V and the brake segment 3 combined with a double liquid supply to the ram V at a high rate of flow and then at a low rate of flow, wear in the brake segments is taken up or compensated automatically and rapidly during the approach stage. This is a very important safety measure and permits increasing the initial clearance $j$ (FIG. 1) between the brake segment 3 and the gear 2 and dispensing with the centering device for centering the brake segment relative to the gear and avoiding any contact between the brake segment and the gear apart from the gear braking period. It should be noted, furthermore, that wear of the brake segments is taken up very simply by hydraulic means which are not liable to get out of order and very advantageously replace the old mechanical devices which are complicated and difficult to adjust. Further, the invention provides progressive and smooth speed changes. Nevertheless, the conditions of engagement of a speed ratio are not the same according as the driving torque is moderate, for example when the vehicle is moving off, or high when the vehicle accelerates. In the first case, it is desirable to engage the speed progressively in the same way as a conventional clutch is engaged progressively in a vehicle equipped with a gear box having sliding gears. The mechanism described permits obtaining this result. When the driving torque is low, the accelerator pedal is but slightly depressed (position 21b shown in full line in FIG. 1). Under these conditions, no action is exerted by the shifting fork 18 on the needle valve 13.

The action of the spring 17 is therefore preponderant. The flange 16 abuts the plug 15 and the broad base of the needle valve 13 is in line with the aperture of the ring 12; the annular passage section between the ring 12 and the needle valve 13 is then minimum. Consequently, the flow rate of the oil supplied to the ram V is also minimum and the engagement of the gear box speed corresponding to the ram V occurs with maximum progressiveness. In FIG. 2 the travel of the piston 7 of the ram is represented by the line OAB.

In the last case, corresponding to changing speed with a high driving torque, it is, on the contrary, essential to engage the speed rapidly to avoid slowing down the vehicle and racing the engine in the interval of time between the moment when the previous speed ratio is just released and the new speed ratio is not yet engaged. Usually, in order to avoid racing the engine and to effect a progressive smooth speed change, the driver is obliged to release the accelerator pedal when changing up to a higher speed. This is no longer necessary with the mechanism of the invention. When the accelerator pedal is depressed to the maximum extent (position 21a shown in dot-dash line in FIG. 1) the driving torque is high, the point of the needle valve 13 is in line with the aperture of the ring 12 and the annular oil passage section is maximum. The rate of flow of the oil supply to the ram V, while being less than when the oil passes through the main pipe line, is greater than in the preceding case and the engagement of the speed occurs smoothly but rapidly for the same position of the accelerator pedal 21. In FIG. 2 the travel of the piston 7 and the ram V is in this case represented by the line OAD. In the event of wear, corresponding to an additional approach travel $c^1$, $c^2$, the travel of the piston 7 is represented by the line $OA^1D^1$.

It will be understood that the annular oil passage section between the ring 12 and the needle valve 13 is regulated automatically as a function of any intermediate position of the pedal 21 between the position in full line, corresponding to a slight depression, and the position in dot-dash line 21ª corresponding to maximum depression of the pedal.

Owing to the mechanism of the invention, the speed changing operations are effected with a progressiveness which is automatically adapted to the torque of the engine without modification of the position of the accelerator pedal 21 or an intervention on the part of the driver, which renders this mechanism applicable to an entirely automatic speed change mechanism.

In the modification shown in FIGS. 3 and 4, the throttling device E¹ for pipes 11ª . . . 11ᵈ, which are similar to the pipe 11 and arranged in parallel, consists of a plurality of needle valves on a common stem 35. Said stem 35 is slidably moved in a bore 36 which is orthogonal to the pipes 11ª . . . 11ᵈ and is extended in the form of a rod 37 which is controlled in a similar manner to the rod shown in FIG. 1 by the accelerator pedal 21 in opposition to the action of a spring 38 compressed between the stem 35 and the end of the bore 36.

The needle valves are formed on the stem 35 by as many conical or tapered recesses 39 separated by flanges 40 as there are pipes 11ª . . . 11ᵈ. The recesses 39 are in the same direction, the large base being directed toward the spring 38. The stem 35 is capable of occupying two extreme positions of abutment against the ends of the bore 36 through the medium of a spigot 41 and a flange 42. When the flange 42 abuts one of the ends of the bore 36 (the spring being in its extended position) the large base of each tapered recess 39 throttles to the maximum extent the passage of each pipe 11ª . . . 11ᵈ. When the spigot 41 abuts the other end of the bore 36 (the spring 38 being compressed) the small base of each recess 39 is in line with each pipe 11ª . . . 11ᵈ and the throttling effect is minimum. All intermediate positions are possible. The operation is the same as that described with respect to the first embodiment.

According to another modification of the mechanism of the invention shown in FIG. 5, the ram V is supplied with liquid by a portion 9 of the main pipe which is connected to the upstream portion 9ª of the main pipe, firstly through a distributor T¹ and, secondly, through a pipe 44 which is connected in parallel and in which is inserted the throttling device E¹ (which could also be the device E of the first embodiment). The distributor T¹ comprises a slide valve 45 having two flanges separated by a recess 46. One end of the slide valve 45 communicates with the pipe 44 by way of the pipe 47 communicating with the end of the bore of the distributor T¹ and is thus subjected to the oil pressure prevailing in the pipe 44 and in the main pipe (9, 9ª), whereas the other end of the slide valve 45 is biased by a spring 48. The distributor T¹, which operates in the same way as the distributor T, is adapted either to interconnect the two portions 9 and 9ª of the main pipe by way of the recess 46 or to close off these portions from one another by one of its flanges. In this way, the ram V receives the oil under pressure firstly mainly by way of the pipes 9 and 44 and then only by way of the pipe 44 and the throttling device E¹.

Although specific embodiments of the invention have been described, many modifications and changes may be made therein without departing from the scope of the invention as defined in the appended claims.

Having now described my invention what I claim as new and desire to secure by Letters Patent is:

1. Hydraulic control mechanism for a gear box which is of the type having gear elements permanently in mesh and in which each speed is engaged by the moving element of a brake, said mechanism comprising in combination with at least one of said moving elements; a hydraulic ram having a cylinder and a piston; a direct connection between said piston and said moving element; a source of liquid under pressure; a main pipe connecting said source to the cylinder of the ram; a secondary pipe branch connected to said main pipe; a throttling device inserted in said secondary pipe; an automatic distributor adapted to produce simultaneously and progressively a closure of the main pipe and an opening of the secondary pipe as a function of the increase in the pressure in the cylinder of the ram; said main pipe having a first pipe portion and a second pipe portion interconnected by said distributor; said first pipe portion being located between said ram and said distributor and said second pipe portion being located between said source of liquid and said distributor; said secondary pipe branch connecting said first pipe portion to said distributor; said distributor comprising: a distributor body having a cylinder bore with which said two pipe portions and said secondary pipe branch communicate; a first end of said bore being connected to said first pipe portion, whereby the same pressure prevails in the ram and at said first end of the bore; a slide valve movable in said bore between a first extreme position corresponding to full communication between said two pipe portions and complete closure of said secondary pipe branch, and a second extreme position corresponding to a complete closure of said first pipe portion and to full communication between said second pipe portion and said secondary pipe branch; and a spring located between said slide valve and a second end of said bore for biasing said slide valve toward the first extreme position in opposition to the pressure prevailing in said ram and prevailing between said first end of the bore and said slide valve.

2. Hydraulic control mechanism for a gear box for a machine driven by an engine having a variable driving torque, the gear box being of the type having gear elements permanently in mesh and in which each speed is engaged by the moving element of a brake, said mechanism comprising in combination with at least one of said moving elements: a hydraulic ram having a cylinder and piston, a direct connection between the piston and the moving element, a source of liquid under pressure, a main pipe connecting the source to the cylinder of the ram, a secondary pipe branch connected to the main pipe, an automatic distributor for controlling at least the flow of the liquid through the main pipe, the distributor being adapted to produce a progressive closure of the main pipe as a function of the increase in the pressure in the cylinder of the ram, a throttling device disposed in the secondary pipe and comprising a movable valve element, movable accelerator means for the engine and a connection between the valve element and said accelerator means whereby the throttling of the secondary pipe varies as a function of the movement of said accelerator means.

3. Hydraulic control mechanism for a gear box for a machine driven by an engine having a variable driving torque, the gear box being of the type having gear elements permanently in mesh and in which each speed is engaged by the moving element of a brake, said mechanism comprising in combination with said moving elements: as many hydraulic rams having a cylinder and a piston as there are moving elements; a direct connection between the piston of each ram and one of said moving elements; a single source of liquid under pressure; for each ram: a main pipe interconnecting the source and the ram cylinder, a secondary pipe branch connected to the main pipe, a distributor adapted to control at least the main pipe as a function of the increase in the pressure in the cylinder of the ram, and a device having a movable valve element for effecting a progressive throttling of the secondary pipe; movable accelerator means for the engine and a single connecting member interconnecting said movable accelerator means and the movable valve elements of the throttling devices pertaining to the different rams, whereby the throttling of the secondary pipes supplying liquid to the rams varies as a function of the movement of said movable accelerator means.

4. Hydraulic control mechanism as claimed in claim 3, wherein said single connecting member consists of a single stem on which are formed the valve elements.

5. For driving a vehicle or other mobile machine, in combination: an engine having a variable driving torque;

movable accelerator means for said engine; a gear box of the type having gear elements permanently in mesh and in which each speed is engaged by the moving element of a brake; a control mechanism for the gear box; said mechanism comprising at least one hydraulic ram having a cylinder and piston, a direct connection between one of said moving elements, a source of liquid under pressure, a main pipe connecting the source to the cylinder of the ram, a secondary pipe branch connected to the main pipe, an automatic distributor for controlling at least the flow of the liquid through the main pipe, the distributor being adapted to produce a progressive closure of the main pipe as a function of the increase in the pressure in the cylinder of the ram, and a throttling device located in the secondary pipe and having a movable valve element; and connecting means disposed between said movable accelerator means and the movable valve element of the throttling device, said connecting means being such that the throttling of the secondary pipe varies as a function of the movement of said movable accelerator means.

References Cited in the file of this patent

UNITED STATES PATENTS

| | | |
|---|---|---|
| 2,692,511 | Nallinger | Oct. 26, 1954 |
| 2,770,148 | Wayman | Nov. 13, 1956 |
| 2,818,708 | Kelley | Jan. 7, 1958 |